United States Patent
Bloome

(10) Patent No.: US 10,710,308 B2
(45) Date of Patent: Jul. 14, 2020

(54) HEATING AND COOLING OF EXTRUSION TOOL FOR ADDITIVE MANUFACTURING

(71) Applicant: Autodesk, Inc., San Rafael, CA (US)

(72) Inventor: Cory Mark Bloome, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 16/009,013

(22) Filed: Jun. 14, 2018

(65) Prior Publication Data

US 2018/0361671 A1 Dec. 20, 2018

Related U.S. Application Data

(60) Provisional application No. 62/519,567, filed on Jun. 14, 2017.

(51) Int. Cl.
| | |
|---|---|
| *B29C 64/393* | (2017.01) |
| *B33Y 30/00* | (2015.01) |
| *B33Y 50/02* | (2015.01) |
| *B29C 64/227* | (2017.01) |
| *B29C 64/209* | (2017.01) |
| *G05B 19/4099* | (2006.01) |
| *B29C 64/295* | (2017.01) |
| *B29C 48/92* | (2019.01) |

(52) U.S. Cl.
CPC ............ *B29C 64/393* (2017.08); *B29C 48/92* (2019.02); *B29C 64/209* (2017.08); *B29C 64/227* (2017.08); *B29C 64/295* (2017.08); *B33Y 30/00* (2014.12); *B33Y 50/02* (2014.12); *G05B 19/4099* (2013.01); *B29C 2948/92066* (2019.02); *B29C 2948/9298* (2019.02); *B29C 2948/92209* (2019.02); *B29C 2948/92485* (2019.02); *B29C 2948/92561* (2019.02); *B29C 2948/92704* (2019.02); *B29C 2948/92923* (2019.02); *G05B 2219/35134* (2013.01); *G05B 2219/49007* (2013.01)

(58) Field of Classification Search
None
See application file for complete search history.

(56) References Cited

U.S. PATENT DOCUMENTS

| | | |
|---|---|---|
| 2006/0156978 A1 | 7/2006 | Lipson et al. |
| 2006/0160250 A1 | 7/2006 | Bonassar et al. |
| 2013/0089642 A1 | 4/2013 | Lipson et al. |

(Continued)

*Primary Examiner* — Sean Shechtman
(74) *Attorney, Agent, or Firm* — Fish & Richardson P.C.

(57) ABSTRACT

An additive manufacturing system, which can include a 3D printer, includes in at least one aspect: a build platform; a carriage and a rack configured to hold different manufacturing tools, including an extrusion tool; a heating device associated with the extrusion tool; a 3D motion system configured to move the carriage between the rack and a build space associated with the build platform, and to move the carriage within the build space associated with the build platform; and one or more computers programmed to trigger the heating device to begin pre-heating the extrusion tool at a point before mounting of the extrusion tool to the carriage by the 3D motion system, such that the material in the extrusion tool is melted by a point in the manufacturing process when the extrusion tool will be mounted on the carriage and in position to extrude material in the build space.

16 Claims, 4 Drawing Sheets

(56) References Cited

U.S. PATENT DOCUMENTS

| | | |
|---|---|---|
| 2015/0174824 A1 | 6/2015 | Gifford et al. |
| 2015/0367576 A1 | 12/2015 | Page |
| 2017/0266876 A1* | 9/2017 | Hocker ................. B33Y 30/00 |
| 2018/0111336 A1* | 4/2018 | Mantell ................. B29C 64/106 |
| 2018/0319098 A1* | 11/2018 | Armijo ................. B33Y 10/00 |

* cited by examiner

HEATING AND COOLING OF EXTRUSION TOOL FOR ADDITIVE MANUFACTURING

CROSS-REFERENCE TO RELATED APPLICATION

This application claims priority to U.S. Provisional Application No. 62/519,567, filed on Jun. 14, 2017. The disclosure of the prior application is considered part of and is incorporated by reference in the disclosure of this application.

BACKGROUND

This specification relates to components of additive manufacturing systems, including three dimensional (3D) printers, such as Fused Filament Fabrication (FFF) 3D printers.

3D printers employ additive manufacturing techniques, where a product can be built by the addition of materials. Various types of additive manufacturing techniques can be employed, including granular techniques (e.g., Selective Laser Sintering (SLS) and Direct Metal Laser Sintering (DMLS)) and extrusion techniques (e.g., FFF). In addition, various types of 3D printer structures are employed for 3D printing. For example, FFF 3D printers include both Cartesian (xyz) type 3D printers and delta type 3D printers. In typical Cartesian (xyz) type 3D printers, a carriage for a hot end for an extruder, and/or a build platform, is connected with rails that extend in the three different dimensions of printing (x, y & z). In contrast, in typical delta type 3D printers, a carriage for a hot end for an extruder is connected by arms with three rails that extend in only the z direction, and the carriage is moved in three dimensions by independently adjusting the positions of end points of the arms along the three rails. In addition, modular 3D printer systems have been proposed, in which exchangeable components can include printheads having different configuration and functionalities.

SUMMARY

This specification describes systems and techniques relating to additive manufacturing systems, including 3D printers, such as FFF 3D printers. In general, one or more aspects of the subject matter described in this specification can be embodied in a 3D printer system including: a build platform; a carriage configured to hold different manufacturing tools, including an extrusion tool; a rack configured to hold the different manufacturing tools, including the extrusion tool, when not mounted on the carriage; a heating device associated with the extrusion tool; a 3D motion system coupled with the carriage and configured to move the carriage between the rack and a build space associated with the build platform, and to move the carriage within the build space associated with the build platform; one or more computer storage media having instructions stored thereon; and one or more data processing apparatus configured to execute the instructions to perform operations including identifying a first point in a manufacturing process when the extrusion tool will be mounted on the carriage and in position to extrude material in the build space, determining a second point, which precedes the first point in the manufacturing process, when the extrusion tool will be located on the rack, wherein a time between the second point and the first point in the manufacturing process is determined in accordance with the material to be extruded by the extrusion tool, and triggering the heating device to begin pre-heating the extrusion tool at the second point before mounting of the extrusion tool to the carriage by the 3D motion system, such that the material in the extrusion tool is melted by the first point in the manufacturing process.

In such implementations of the 3D printer system, the extrusion tool can reach a target temperature just before arriving in the position to extrude the material in the build space, the heating device can be coupled with the rack, the heating device can be a Peltier device, the rack can include a temperature sensor, and/or the rack can be coupled with the 3D motion system and moves along with at least one axis of the 3D printer system. In these and other implementations, the one or more data processing apparatus can be configured to execute the instructions to determine the second point by performing operations including repeatedly recalculating a heating equation using actively collected temperature measurements.

Additionally, in various implementations, the heating device can be integrated with the extrusion tool, the system can include a cooling device associated with the extrusion tool, and the one or more data processing apparatus can be configured to execute the instructions to perform operations including triggering the cooling device to reduce a temperature of the extrusion tool when the extrusion tool is relocated on the rack after use of the extrusion tool in the manufacturing process. The cooling device can be coupled with the rack. The extrusion tool can include a melt zone and a heat sink, where the melt zone is upstream from an aperture of a nozzle of the extrusion tool, the heat sink is upstream from the melt zone, and the cooling device can be configured to actively cool the heat sink, the nozzle, or both. Further, the cooling device can include a fan and/or a Peltier, such as a Peltier device that is positioned on the rack to make contact with the heat sink, the nozzle, or both, when the extrusion tool is relocated on the rack.

The extrusion tool can include at least a hot end of a Fused Filament Fabrication (FFF) extruder assembly. The one or more data processing apparatus can be configured to execute the instructions to perform operations including: identifying a third point after the first point in the manufacturing process when use of the extrusion tool will end and the extrusion tool will be relocated on the rack; determining a fourth point, which succeeds the third point in the manufacturing process, when the extrusion tool will be relocated on the rack, wherein a time between the third point and the fourth point in the manufacturing process is determined in accordance with the material extruded by the extrusion tool and the temperature of the extrusion tool during the material extrusion; and operating the cooling device until the fourth point in the manufacturing process to reduce the temperature of the extrusion tool. Further, the one or more data processing apparatus can be configured to execute the instructions to determine the fourth point by performing operations including repeatedly recalculating a cooling equation using actively collected temperature measurements.

In addition, one or more aspects of the subject matter described in this specification can be embodied in a method including: identifying a first point in a manufacturing process when an extrusion tool will be mounted on a carriage and in position to extrude material in a build space; determining a second point, which precedes the first point in the manufacturing process, when the extrusion tool will be located on a rack, wherein a time between the second point and the first point in the manufacturing process is determined in accordance with the material to be extruded by the extrusion tool; and triggering a heating device to begin pre-heating the extrusion tool at the second point before mounting of the extrusion tool to the carriage, such that the material in the extrusion tool is melted by the first point in the manufacturing process. This and other methods can also be embodied in a non-transitory computer-readable medium encoding instructions that cause a data processing apparatus associated with a 3D printer system to perform operations of the disclosed methods.

In such method and computer-readable medium implementations, the extrusion tool can reach a target temperature just before arriving in the position to extrude the material in the build space, and determining the second point can include repeatedly recalculating a heating equation using actively collected temperature measurements. The method can include triggering a cooling device to reduce a temperature of the extrusion tool when the extrusion tool is relocated on the rack after use of the extrusion tool in the manufacturing process. Moreover, the method can include: identifying a third point after the first point in the manufacturing process when use of the extrusion tool will end and the extrusion tool will be relocated on the rack; determining a fourth point, which succeeds the third point in the manufacturing process, when the extrusion tool will be relocated on the rack, wherein a time between the third point and the fourth point in the manufacturing process is determined in accordance with the material extruded by the extrusion tool and the temperature of the extrusion tool during the material extrusion; and operating the cooling device until the fourth point in the manufacturing process to reduce the temperature of the extrusion tool. In some implementations, determining the fourth point can include repeatedly recalculating a cooling equation using actively collected temperature measurements.

Particular embodiments of the subject matter described in this specification can be implemented to realize one or more of the following advantages. Pre-heating of an extrusion tool (e.g., beginning to heat the extrusion tool before mounting the extrusion tool to the carriage for use in 3D printing) can improve manufacturing efficiency by ensuring that an extruder is ready to operate when needed, without wasting energy or risking premature extrusion. In addition to the energy savings, reducing the risk of material extrusion at improper times in a manufacturing process can also result in fewer requirements for cleanup, thus reducing down time for a manufacturing system that employs extrusion based additive manufacturing systems and techniques. Moreover, by beginning the heating at an appropriate time, the extrusion material (e.g., polymer extrudate) need not be kept hot for too long, which can cause degradation of the extrusion material.

Further, post-cooling of an extrusion tool (e.g., continuing to cool the extrusion tool after its use in 3D printing, and even after dismounting the extrusion tool from the carriage) for only the amount of time that the cooling is actually needed can also improve manufacturing efficiency. The quality of the extrusion material can be kept high by freezing the material as soon as possible since the extrusion material can degrade and sometimes carbonize with heat. In addition, by reducing or preventing undesired heat propagation up filament, clogging of the extrusion tool can be reduced or eliminated, which can also reduce down time for the manufacturing system and reduce or eliminate material waste.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
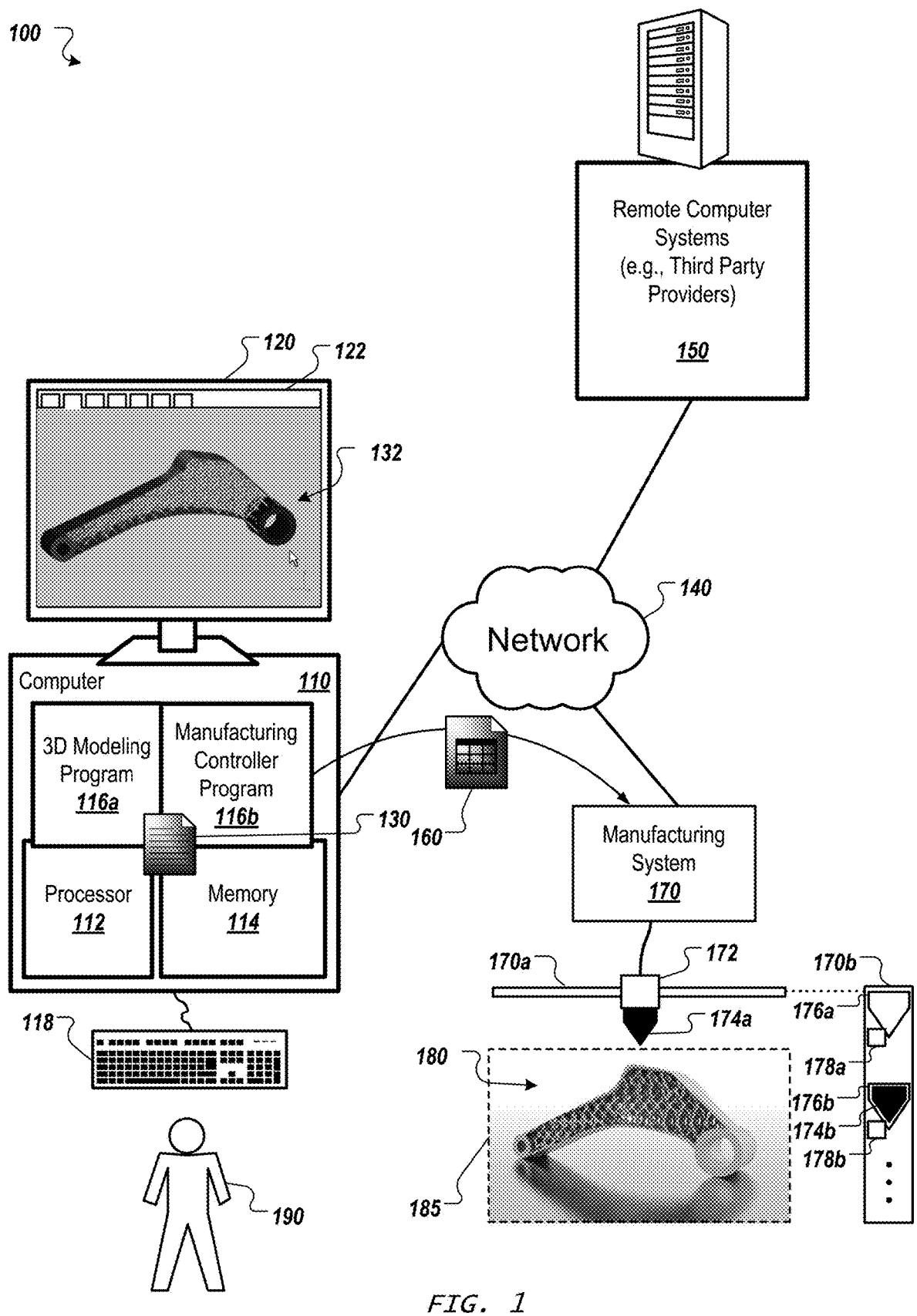
FIG. 1 shows an example of a system to design and manufacture objects using tool changing techniques including pre-heating and post-cooling of an extrusion tool.

FIG. 1 shows an example of a system 100 to design and manufacture objects using tool changing techniques including pre-heating and post-cooling of an extrusion tool. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs can include a 3D modeling program 116a, which can run locally on computer 110, remotely on a computer of one or more remote computer systems 150 (e.g., one or more third party providers' one or more server systems accessible by the computer 110 via the network 140), or both. The 3D modeling program 116a presents a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer.

A user 190 can interact with the 3D modeling program 116a to create a 3D model 132. This can be done using known graphical user interface tools. In the example shown, the 3D model 132 is a bracket that includes an internal lattice structure to improve strength and reduce weight, but such a structure is not required. Rather, various suitable forms of 3D model 132 can be created to represent a wide variety of 3D objects that can be manufactured, such as by using additive manufacturing systems and techniques. In some implementations, the programs that run on the processor 112 include a manufacturing controller program 116b, a slicer program, a tool path generation program, etc. Such programs can be separate from the 3D modeling program 116a or integrated into the 3D modeling program 116a or into each other. Thus, a "program" as referenced herein can be a procedure within another program. Moreover, in some implementations, such program(s) run on a processor in a manufacturing system 170, which can also include processor(s) and memory and constitute a computer, similar to computer 110.

In various implementations, the 3D modeling program 116a is programed to provide various user interface elements to enable the user 190 to design the 3D model 132, specify materials and loading cases, perform simulation, etc. Once the user 190 is satisfied with the model 132, the 3D model 132 is stored as a document 130 and/or used to generate another representation of the model (e.g., an .STL file for additive manufacturing). This can be done upon request by the user 190, or in light of the user's request for another action, such as sending the 3D model 132 to the manufacturing system 170, which can be directly connected to the computer 110, e.g., integrated with the computer 110, or connected via the network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files. In any case, the 3D modeling program 116a is used to create the 3D model 132, and a manufacturing controller program 116b is used to assist in generating a document 160 (of an appropriate format) for use by the manufacturing system 170 to coordinate its manufacturing activities, including tool changing activities, to create a 3D object 180 corresponding to the 3D model 132.

The manufacturing system 170 includes a 3D motion system 170a that moves at least one carriage 172 to operate an attached tool 174a in a build space 185 to create the 3D object 180. Note that although shown in FIG. 1 as a simple linear system, in typical implementations, the 3D motion system 170a operates in more than one dimension (e.g., a Cartesian (xyz) type 3D printer motion system or a delta type 3D printer). In addition, the 3D motion system 170a moves the carriage 172 in relation to a tool rack 170b to change from using one tool 174a to another tool 174b. In some implementations, the tool rack 170b is separate from the 3D motion system 170a and always remains outside the build space 185. In some implementations, the tool rack 170b is integrated with the 3D motion system 170a and can be at least partially within the build space 185 at times, depending on the operation of the 3D motion system 170a.

The document 160 provides instructions to control the motion of the carriage 172 to both change the tool being used (e.g., placing the tool 174a in a first holder 176a, and then retrieving the tool 174b from a second holder 176b) and to use the currently attached tool in the build space 185. Thus, multiple tools can be used during the construction of the object 180. Note that while the pre-heating and post-cooling systems and techniques described focus on extrusion tools, the manufacturing system 170 can employ many different types of tools. In some implementations, the tools employ one or more additive manufacturing techniques, such as granular techniques (e.g., Selective Laser Sintering (SLS) and Direct Metal Laser Sintering (DMLS)) and extrusion techniques (e.g., Fused Filament Fabrication (FFF)). In some implementations, the tools employ subtractive manufacturing techniques or other computer aided manufacturing techniques, potentially in combination with additive manufacturing techniques.

In addition, the tools can include robots that perform activities in more than one dimension (e.g., each robot can have three degrees of freedom for its movement, where at least one of those degrees of freedom creates overlap with another robot in the build space 185), and in some implementations, more than one carriage 172 is used and their activities are coordinated with each other to create the 3D object 180. Thus, various types of manufacturing systems 170 can be employed. For additional implementation details for a manufacturing system 170, see PCT/US2016/051163, filed Sep. 9, 2016, and entitled "MULTI-TOOL MANUFACTURING SYSTEM", and also see U.S. application Ser. No. 15/406,446, filed Jan. 13, 2017, and entitled "MULTI-TOOL SCHEDULING FOR COOPERATIVE MANUFACTURING", which applications are hereby incorporated by reference.

The system 100 includes one or more heating and cooling devices 178a, 178b (e.g., a Peltier device, which can be used to heat or cool). In various implementations, one or more of the heating and cooling devices can be located on the rack 170b adjacent the holders 176a, 176b, on the tools 174a, 174b themselves, or both. For example, in some implementations, the holders 176a, 176b are designed to receive different extrusion tools 174a, 174b and include resistance-based electric heaters 178a, 178b as well as fans 178a, 178b, as described in further detail below in connection with FIG. 2B. In addition, in some implementations, each of the different extrusion tools 174a, 174b also includes an on-board heating device (e.g., another resistance-based electric heater proximate to a melt zone of the extrusion tool) and an on-board cooling device (e.g., a fan directed to a heat sink and/or nozzle of the extrusion tool). Moreover, the rack 170b can include more than the two holders shown, which can be designed to hold additional extrusion tools or other types of manufacturing tools, as noted above.

In any case, a computer in the system 100 (e.g., computer 110, a computer at the remote system 150, or a computer in the system 170) identifies a point in a manufacturing process when an extrusion tool 174a will be mounted on the carriage 172 and be in position to extrude material (e.g., a thermoplastic) in the build space 185, determines a second point when the extrusion tool 174a will be located on the rack 170b, and triggers the heating device 178a to begin pre-heating the extrusion tool 174a at the second point before mounting of the extrusion tool 174a to the carriage 172 by the 3D motion system 170a. This allows the material in the extrusion tool 174a to reach at least a glass transition temperature of the material to be extruded by the first point in the manufacturing process. In addition, a computer in the system 100 (e.g., computer 110, a computer at the remote system 150, or a computer in the system 170) can also identify a third point after the first point in the manufacturing process when use of the extrusion tool 174a will end and the extrusion tool will be relocated on the rack 170b, determine a fourth point when the extrusion tool 174a will be relocated on the rack 170b, and operate a cooling device 178a until the fourth point in the manufacturing process to reduce the temperature of the extrusion tool to a temperature below the glass transition temperature of the material. Such pre-heating and post-cooling operations can improve manufacturing efficiency (e.g., less energy may be used and less system cleanup may be required).

In some implementations, this computer processing (for pre-heating, post-cooling, or both) is performed entirely in advance of the manufacturing process. For example, the determinations of the relevant points in time can be done by the computer 110 and included as time-based instructions in the document 160 provided to the manufacturing system 170. For example, the temperature of the melt zone of an extrusion tool can be estimated in advance, during the time the tool paths are being defined, based on an expected ambient air temperature and the planned uses of the extruder tool during the manufacturing operations being defined. On the other hand, in some implementations, this computer processing (for pre-heating, post-cooling, or both) is performed at least partially in real time based on data received from a temperature sensor for the extrusion tool 174a. For example, the determinations of the relevant points in time can be done by a computer in the manufacturing system 170 using a closed loop comparison of temperature data with one or more target temperatures.

Figure 2A:
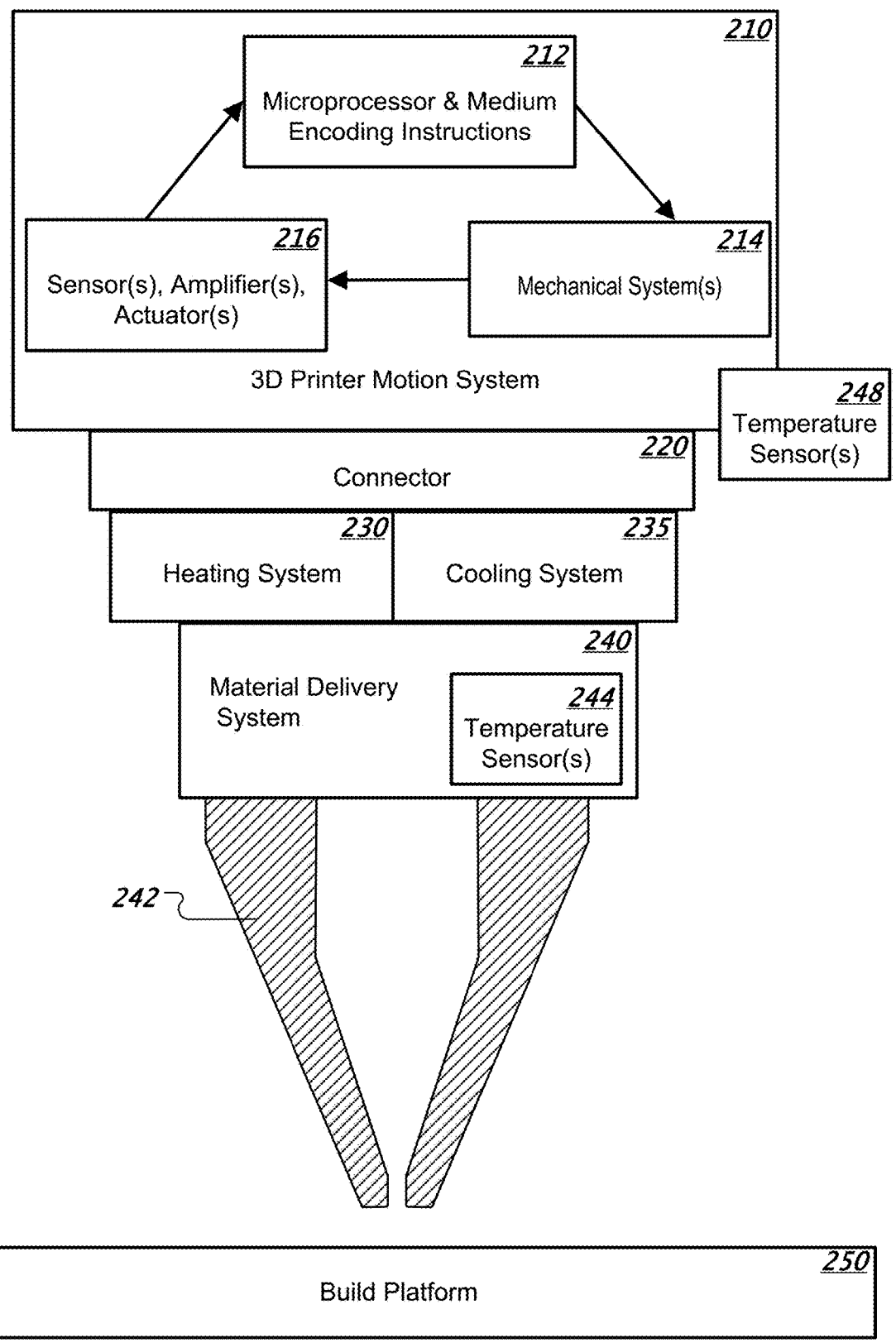
FIG. 2A is a block diagram showing an example of an extruder assembly over a build platform.

FIG. 2A is a block diagram showing an example of an extruder assembly over a build platform. The extruder assembly represents various types of 3D printers, and while the specific structures are different in different types of 3D printers, each 3D printer includes a 3D printer motion system 210. The 3D printer motion system 210 operates to move the carriage (and thus the hot end) in relation to the 3D build volume above the build platform 250. Thus, the 3D printer motion system 210 can include at least one controller and an input/output (I/O) subsystem.

In some implementations, the 3D printer motion system 210 includes at least one processor and medium encoding instruction 212 (e.g., a microprocessor with embedded firmware), one or more mechanical systems 214 (e.g., to physically move the carriage, the build platform, or both), and one or more sensor(s), amplifier(s), and actuator(s) 216. Thus, the 3D printer motion system 210 can be a mechatronic system, which monitors the build environment and/or the 3D printer using sensors, and processes the sensor information in order to change the behavior of the system so as to react to changes in the build environment and/or the 3D printer itself. In this case, the encoded instructions (e.g., software) has become an integral element of the 3D printer, allowing the 3D printer to identify and react to situational changes that can occur during 3D printing.

In some implementations, the 3D printer motion system 210 includes one or more portions of the extruder. For example, the system 210 can include the extrusion motor, filament drive mechanism, or both. In any case, the 3D printer motion system 210 causes movement of the hot end in relation to the build volume, and so these motions are coordinated with the melting and extruding done at the hot end. Further, the hot end tool attaches to the 3D printer motion system 210 through a connector 220, which can be one or more of various types of mechanical connectors, which may or may not include locking mechanisms.

The hot end includes at least a portion of a heating system 230. For example, the heating system 230 can include an electric resistive heater, a Peltier device, or a combination of these. The hot end can also include at least a portion of a cooling system 235 (e.g., air cooled, liquid cooled, or both). For example, the cooling system 235 can include a heat sink and a cooling delivery system (e.g., air ducting for blown air, one or more fans, one or more heat pipes, or a combination of these) for cooling the heat sink and a nozzle 242 (the nozzle 242 is shown in cross-section in the schematic of FIG. 2A) and/or the material dispensed by the nozzle 242. In addition, a material delivery system 240 (e.g., an FFF material delivery channel defined by a filament guide tube and a thermal barrier) connects the nozzle 242 with the upstream components. Note that in some implementations, a 3D printer can be designed to have as little coupling between the heater and the heat sink as possible; the heat sink is included to help remove undesirable heat that travels up to the region above where liquefaction of the extrusion material happens.

In addition, although the heating system 230, the cooling system 235, and the material delivery system 240 are shown as distinct boxes in the schematic of FIG. 2A, it will be appreciated that these structures can overlap with each other. For further details regarding possible structures to use for the hot end, see U.S. patent application Ser. No. 15/222,668, titled, "NARROW ANGLE HOT END FOR THREE DIMENSIONAL (3D) PRINTER", filed Jul. 28, 2016, which application is hereby incorporated by reference. In some implementations, the build platform 250 can employ the systems and techniques described in U.S. patent application Ser. No. 15/338,068, titled "CONTROLLABLE RELEASE BUILD PLATE FOR 3D PRINTER", filed on Oct. 28, 2016, which application is hereby incorporated by reference. In some implementations, the system 210 can include extruder drives that employ the systems and techniques described in U.S. Patent Application No. 62/287,352, titled "EXTRUDER DRIVE MECHANISM FOR THREE DIMENSIONAL (3D) PRINTER", filed on Jan. 26, 2016, which application is hereby incorporated by reference. In some implementations, the systems and techniques included in U.S. Publication No. 2016-0332378-A1, titled THREE DIMENSIONAL (3D) DELTA PINTER FRAME STRUCTURE, filed on Jul. 28, 2016, and published on Nov. 17, 2016, which application is hereby incorporated by reference, can also be used.

The material delivery system 240 includes one or more temperature sensors 244, which provide temperature data for the melt zone for the nozzle 242 and the extrusion material therein. In some implementations, the data from the temperature sensor 244 is actively monitored during 3D printing of an object, including potentially actively tracking the temperature of the melt zone when the extrusion tool is not currently in use. In some implementations, the system includes one or more temperature sensors 248, which provide temperature data for the environment (e.g., ambient air temperature). In some implementations, the temperature sensor(s) 248 are part of the extruder assembly, e.g., attached to the 3D printer motion system 210. In some implementations, the temperature sensor(s) 248 are located elsewhere in the 3D printing system.

In some implementations, physical testing, simulation, or both are used to generate data that empirically characterizes the temperature of the nozzle 242 as a function of time curve. Note that the process of determining a specific equation for this time function for a specific extrusion tool can be dependent upon specific physical structures and material properties of the extrusion tool components upstream from the melt zone (e.g., a thermal barrier and a heat sink) in addition to specific physical structures and material properties of the melt zone components of the extrusion tool (e.g., the nozzle and heater). For example, the time function can be determined empirically using a given extruder set up by running the extruder in various temperature and humidity environments, with various materials, and temperature observations can be made to assess the time to heat in accordance with the different environment and extrusion material variables. In some implementations, a safety margin can also be added to ensure that enough time is provided for the pre-heating, where the amount of safety margin can be dependent upon the impact of the different environment and extrusion material variables on the heating time.

In the case of simulation, information about the extruder geometry, extruder component materials, print media phase change energy and other thermal properties, airflow, ambient temperature and humidity can be fed into a computer program that simulates thermal characteristics of an extruder system to generate the time function for a given extruder set up. In some implementations, both simulation and empirical testing are used in conjunction with each other to determine an appropriate pre-heating protocol for a given extruder set up. With regard to the details of heater operation, the heater can be turned on at full power from beginning to end of the pre-heating process, and then closed loop temperature monitoring can be employed to maintain the target temperature. However, in some implementations, heater wattage can be varied or PWM (pulse width modulation) control techniques can be employed.

In any case, such a time/temperature function can be used to control the pre-heating and post-cooling, potentially using additional inputs during operation (e.g., temperature readings from temperature sensors 242, 248). Further, such characterizing functions can include adjustability for other parameters, such as different ambient temperatures. In some implementations, an adjustable parameter includes the material type to be extruded. In some implementations, only one material (or only similar types of materials) will be extruded, and so the properties of the material will be taken into account in the generation of the characterizing function(s) without including material type as a separately adjustable parameter.

Figure 2B:
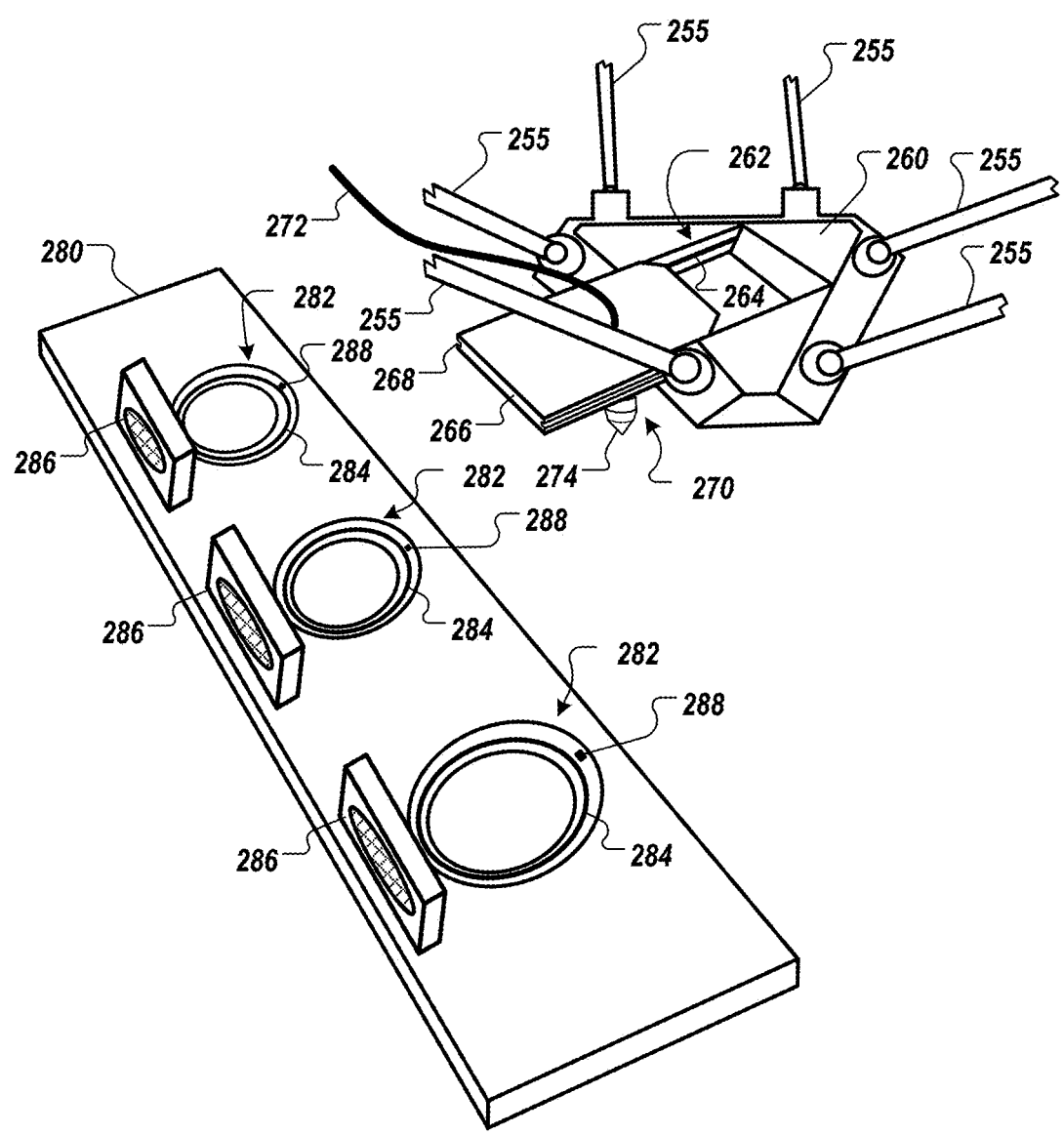
FIG. 2B is a perspective view showing an example of a tool connector and a tool rack for use with a carriage and a 3D printer motion system.

FIG. 2B is a perspective view showing an example of a tool connector and a tool rack for use with a carriage and a 3D printer motion system. In this example, the 3D printer motion system (most of which is not shown) provides a delta type 3D printer motion, where six arms 255 connect a carriage 260 with the rest of the delta type 3D printer motion system, e.g., with rail carts of a rail motor assembly, which is operated by a controller, such as computer hardware programed with software, or dedicated circuitry, such as an ASIC (application specific integrated circuit). In addition, the connector structure in this example is a tongue and groove connector.

The carriage 260 includes a cutout portion 262 sized to receive an extrusion tool 266, and the connector includes two parts: one or more tongues 264 on one or more surfaces of the cutout portion 262, and one or more grooves 268 on one or more corresponding surfaces of the extrusion tool 266. The extrusion tool 266 includes a hot end 270, which is fed FFF material 272 for liquefaction and extrusion through a nozzle 274.

The carriage 260 can be used to pick up the extrusion tool 266 from the rack 280, when needed, and then replace the extrusion tool 266 to the rack when done using it. In the example shown, the rack 280 includes three, identical holders 282. Thus, the extrusion tool 266 can be placed in any of the holders 282 when not in use. As will be appreciated though, the holders 282 can have different designs for different tools, including potentially a one-to-one correspondence between holder and tool. Moreover, more than three holders 282 can be used (e.g., three holders of one type for extrusion tools with different nozzles, plus one or more additional holders for other manufacturing tools used by the system).

In the example shown, each holder 282 includes a beveled surface that matches up with a corresponding beveled surface (not shown) on the underside of the extrusion tool 266. These two beveled surfaces ensure that the extrusion tool 266 is held by gravity in the holder 282 in the correct, predefined location. Other more complicated surfaces can also be employed, which can help ensure a proper rotational orientation, in addition to maintaining a correct vertical position for the tool 266 on the rack 280.

To pick up a new tool, the carriage 260 is moved to a position adjacent the rack 280, with the tongues 264 lined up with the grooves 268 in a known plane for the rack 280. Then the carriage 260 is translated horizontally within the plane, such that the tongues 264 slide into the grooves 268. With the tool 266 in place within the cutout portion 262, the carriage can then be raised vertically to lift the tool 266 out of the holder 282 for use in additive manufacturing. To replace the tool 266 on the rack 280, the same process is performed in reverse. In addition, in some implementations, locking and unlocking mechanisms can also be used to secure, and then unsecure, the tool 266 to the carriage and/or the tool 266 to the rack 280.

Note that, in addition to the time needed to attach the extruder tool 266 to the carriage 260, it takes time for an extruder (e.g., for FFF printing) to heat up from ambient temperature to operating temperature. The time required to heat an extruder can result in process delays, but by pre-heating an un-mounted extruder 266 before mounting on the carriage 260, a tool-changing 3D printer can begin using the extruder 266 as soon as it is mounted. Thus, pre-heating the extruder tool 266 can reduce manufacturing time by avoiding delay between the time the extruder 266 is mounted for use and the time it can actually extrude material.

In some implementations, the pre-heating is performed using a heater built into the hot end 270 (e.g., using heating system 230). In some implementations, the pre-heating is performed using a heater built into the rack 280. For example, each holder 282 can include a heater 284 (e.g., an electric resistive heater, a Peltier device, or a combination of these). In some implementations, the pre-heating is performed using both a heater built into the hot end 270 and a heater built into the rack 280.

In addition, note that 3D print heads are generally kept loaded with print media/material when not printing. Such media often degrade when left at elevated temperatures, and so with many types of 3D printing materials, the extruder should not be left hot for an extended period of time. In view of this, pre-heated extruders (e.g., extruder tool 266) should reach a target temperature immediately before they are to be used. Thus, the timing for when to begin pre-heating can take into account the time needed to mount the tool 266 onto the carriage 260, plus the time needed to move the carriage 260 to its first extrusion location.

In addition, post-cooling of the extrusion tool 266 can also be employed to facilitate manufacturing processes. During normal extruder operation, the melt zone in the extruder is the volume in which media is in a melted state. Generally, the melt zone consists of the volume within the extruder nozzle and a volume where the heater is affixed, immediately upstream of the extruder nozzle.

For normal extruder operation it is desirable to keep melted media either in the melt zone or down-stream of the melt zone, i.e., in the heater area, in the nozzle or extruded. When melted material travels upstream of the melt zone there is a substantial risk of clogging the extruder. For this reason, many extruders employ some means, such as a fan and/or a heat sink, upstream of the melt zone in order to create a steep thermal gradient upstream of the melt zone. The steep thermal gradient is a rapid temperature transition, from the melt zone temperature where the media in a liquid state, to a lower temperature zone that is below the glass transition temperature of the media. A steep thermal gradient helps define the melt zone in the extruder and ensures that the area in the material path upstream of the melt zone is relatively cool and therefore does not contain melted material.

For many operations, including stopping printing, it is desirable to turn off the heater in an extruder. When turning off a heater, it is desirable to continue to actively cool the area upstream of the melt zone and maintain the steep thermal gradient. This is because material in the melt zone remains melted for some time after the heater is off. Without active cooling, the thermal gradient would be reduced and melted material could still travel upstream in the extruder and cause clogging. However, after a certain amount of active cooling after an extruder has stopped being used, no additional cooling is needed since the melt zone is no longer hot enough to potentially melt upstream media, and thus continuing to perform active cooling beyond this point is a waste of energy.

In some implementations, the time of post-cooling is controlled to avoid wasted energy and improve the manufacturing process overall. In some implementations, the post-cooling is performed using a cooler built into the hot end 270 (e.g., using cooling system 235). In some implementations, the post-cooling is performed using a cooler attached to the carriage 260. In some implementations, the post-cooling is performed using a cooler built into the rack 280. For example, each holder 282 can include a cooler 286 (e.g., a fan, a Peltier device, or a combination of these). In some implementations, the post-cooling is performed using a combination of coolers built into the hot end 270, attached to the carriage 260, and/or built into the rack 280.

The cooler can be directed upstream of the melt zone, directed at the melt zone, or both. For example, a Peltier device 284 can be built into to rack 280 at a position in a holder 282 that matches up with a heat sink of the extrusion tool 266, a fan can be attached to the rack 280 at a position relative to the holder to blow air on the nozzle 274, or both. In some implementations, Peltier devices 284 are used to cool the upstream components, while fans 286 (which can be repositioned below the rack 280) are used to cool the melt zones of the extrusion tools in the rack 280. In some implementations, one or more of the Peltier devices 284 are located in the rack 280 at positions where the Peltier devices 284 make contact with the heat sink, the nozzle, or both, and effect cooling through conduction. Moreover, in some implementations, the rack 280 also includes temperature sensors 288, e.g., to actively monitor the temperature of the heat sink, the nozzle, or both, as the cooling progresses.

Figure 3:
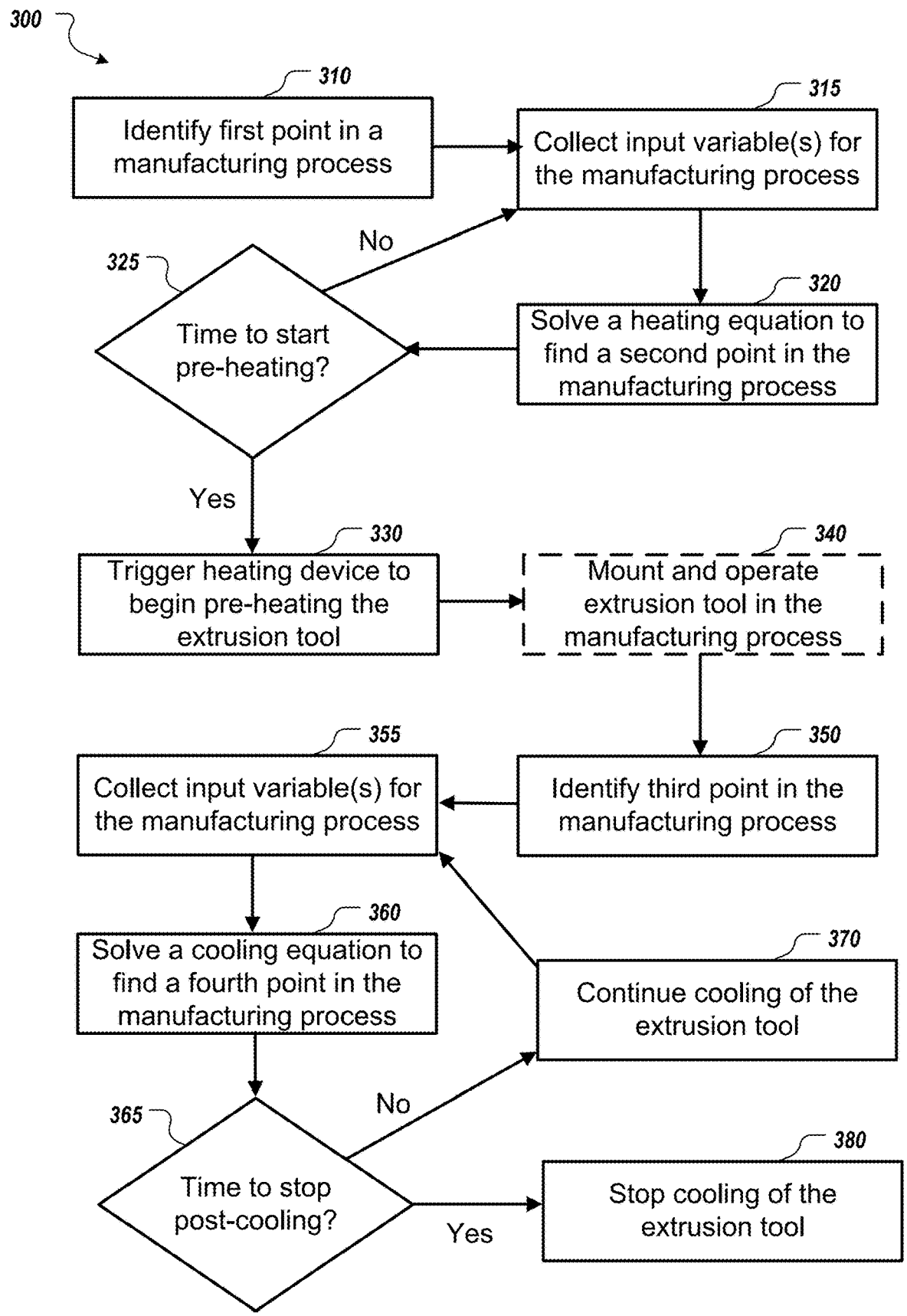
FIG. 3 shows an example of a process of using pre-heating and post-cooling of an extrusion tool in additive manufacturing.

FIG. 3 shows an example of a process 300 of using pre-heating and post-cooling of an extrusion tool in additive manufacturing. A first point in in a manufacturing process is identified 310, where this first point corresponds to an expected time when an extrusion tool will be mounted and in position to extrude material in the build space. This can involve processing tool path information to determine a point in time (measured in units of time, in units of tool path instructions, or otherwise) when the extrusion tool should be ready to extrude material.

One or more input variables for the manufacturing process can be collected 315 and used when solving 320 a heating equation, in accordance with the material to be extruded by the extrusion tool. The input variable(s) can include temperature data (e.g., from temperature sensors 242, 248) and extrusion material type information. In addition, the heating equation can be a function that characterizes the temperature of the extrusion tool in relation to time, as described above.

The heating equation is solved 320 to find a second point in the manufacturing process, where this second point precedes the first point and corresponds to an expected time (measured in units of time, in units of tool path instructions, or otherwise) when pre-heating of the extrusion tool should begin. This second point in time may occur when the extrusion tool is already mounted (e.g., connected to the carriage 260), or this second point in time may occur when the extrusion tool is still unmounted (e.g., on the rack 280). Moreover, the solving 320 can be part of an ongoing calculation process that actively updates the second point.

A check is made 325 as to whether it is time to start pre-heating an extrusion tool based on the calculated second point. In some implementations, temperature measurements (e.g., of the melt zone, a heat sink, and ambient air) are actively (e.g., continuously or periodically) collected 315 and fed into a computer to repeatedly recalculate the heating equation to update the second point in time. Once it is determined 325 that the actively updated second point in time has been reached, at least one heating device is triggered 330 to begin pre-heating the extrusion tool such that the material in the extrusion tool reaches at least a glass transition temperature of the extrusion material by the first point in the manufacturing process.

In some implementations, more than one heating device is triggered 330, either at the same time or at different times. For example, initially a heater on the rack can be triggered, the active solving 320 of the heating equation can continue to ensure that the heating is progressing as expected, and a heater on the extrusion tool can be triggered at another second point in time to ensure the material in the extrusion tool reaches the glass transition temperature of the extrusion material by the first point in the manufacturing process. Further, in some implementations, the temperature(s) are actively tracked throughout the manufacturing process (i.e., even while the extrusion tool is not in use).

As part of the process 300 or as part of another process, which can be performed (at least in part) in parallel, the extrusion tool is mounted and operated 340 in the manufacturing process. Note that the pre-heating process 300 is in some sense decoupled from the mounting process since the pre-heating process 300 can start the pre-heating irrespective of whether the extrusion tool is mounted or not. Rather, the pre-heating process 300 is geared to trigger pre-heating based on the point in the manufacturing process when the extrusion tool needs to be ready to extrude material. In fact, using the heating equation as described above, the triggering 330 can be performed at the exact right time to ensure that the melt zone of the extrusion tool passes the glass transition temperature and reaches the extrusion (target) temperature just before the extrusion tool arrives in the position to extrude the material in the build space.

In some implementations, a third point in the manufacturing process is identified 350, where this third point succeeds the first point and corresponds to an expected time when use of the extrusion tool will end and the extrusion tool will be dismounted (e.g., put back on the rack 280). This can involve processing tool path information to determine a point in time (measured in units of time, in units of tool path instructions, or otherwise) when a given use of the extrusion tool during the manufacturing process will stop. Note that this stop may be only temporary, since the extrusion tool may be remounted later on for further use in the manufacturing process.

One or more input variables for the manufacturing process are collected 355 and used when solving 360 a cooling equation, in accordance with the material to be extruded by the extrusion tool. The input variable(s) can include temperature data (e.g., from temperature sensors 242, 248) and extrusion material type information. In addition, the cooling equation can be a function that characterizes the temperature of the extrusion tool in relation to time, as described above with respect to the heating equation (i.e., the cooling equation can also be created using physical testing, simulation, or both to generate data that empirically characterizes the temperature of the nozzle 242 as a function of time curve, e.g., taking into account the specific physical structures and material properties of the extrusion tool components, as done for the heating equation). In some implementations, the cooling equation and the heating equation are combined into a single representation of temperature changes as a function of time.

The cooling equation is solved 360 to find a fourth point in the manufacturing process, where this fourth point succeeds the third point and corresponds to an expected time (measured in units of time, in units of tool path instructions, or otherwise) when further cooling of the extrusion tool will no longer be needed to help prevent clogging of the extrusion tool, in accordance with the extrusion material. Note that this fourth point may occur before or after the extrusion tool is dismounted (e.g., relocated on the rack 280) depending on how much cooling is needed and how long remounting takes for the specific extrusion tool. Moreover, the solving 360 can be part of an ongoing calculation process that actively updates the fourth point.

A check is made 365 as to whether it is time to stop post-cooling of the extrusion tool based on the calculated fourth point. In some implementations, temperature measurements (e.g., of the melt zone, a heat sink, and ambient air) are actively (e.g., continuously or periodically) collected 355 and fed into a computer to repeatedly recalculate the cooling equation to update the fourth point in time, and the cooling of the extrusion tool continues 370 until the fourth point is reached. Once it is determined 365 that the actively updated fourth point in time has been reached, the cooling of the extrusion tool is stopped 380. Note that the cooling can begin before or after rack mounting, and more than one cooling device can be used (e.g., a fan on the carriage 260 can be used initially, and then a fan on the rack 280 can be used during and after the unmounting of the extrusion tool, where the actively monitored temperature can be assessed throughout, and reaching the fourth point can thus trigger stopping of the appropriate fan). In some implementations, cooling continues for at least a duration sufficient to prevent clogging of the extrusion tool. In some implementations, cooling may stop after that duration or continue indefinitely.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Thus, particular embodiments of the invention have been described. Other embodiments are within the scope of the following claims. In addition, the actions recited in the claims can be performed in a different order and still achieve desirable results.

What is claimed is:

1. A three dimensional (3D) printer system comprising:
   a build platform;
   a carriage configured to hold different manufacturing tools, including an extrusion tool;
   a rack configured to hold the different manufacturing tools, including the extrusion tool, when not mounted on the carriage;
   a heating device associated with the extrusion tool;
   a 3D motion system coupled with the carriage and configured to move the carriage between the rack and a build space associated with the build platform, and to move the carriage within the build space associated with the build platform;
   one or more computer storage media having instructions stored thereon; and
   one or more data processing apparatus configured to execute the instructions to perform operations comprising
      identifying a first point in a manufacturing process when the extrusion tool will be mounted on the carriage and in position to extrude material in the build space,
      determining a second point, which precedes the first point in the manufacturing process, when the extrusion tool will be located on the rack, wherein a time between the second point and the first point in the manufacturing process is determined in accordance with the material to be extruded by the extrusion tool, and
      triggering the heating device to begin pre-heating the extrusion tool at the second point before mounting of the extrusion tool to the carriage by the 3D motion system, such that the material in the extrusion tool is melted by the first point in the manufacturing process;
   wherein the heating device is integrated with the extrusion tool, the system comprises a cooling device associated with the extrusion tool, and the one or more data processing apparatus are configured to execute the instructions to perform operations comprising triggering the cooling device to reduce a temperature of the extrusion tool when the extrusion tool is relocated on the rack after use of the extrusion tool in the manufacturing process;
   wherein the one or more data processing apparatus are configured to execute the instructions to perform operations comprising:
   identifying a third point after the first point in the manufacturing process when use of the extrusion tool will end and the extrusion tool will be relocated on the rack;
   determining a fourth point, which succeeds the third point in the manufacturing process, when the extrusion tool will be relocated on the rack, wherein a time between the third point and the fourth point in the manufacturing process is determined in accordance with the material extruded by the extrusion tool and the temperature of the extrusion tool during the material extrusion; and
   operating the cooling device until the fourth point in the manufacturing process to reduce the temperature of the extrusion tool;

wherein the one or more data processing apparatus are configured to execute the instructions to determine the fourth point by performing operations comprising repeatedly recalculating a cooling equation using actively collected temperature measurements.

2. The 3D printer system of claim 1, wherein the extrusion tool reaches a target temperature just before arriving in the position to extrude the material in the build space.

3. The 3D printer system of claim 1, wherein the heating device is coupled with the rack.

4. The 3D printer system of claim 3, wherein the heating device is a Peltier device.

5. The 3D printer system of claim 3, wherein the rack comprises a temperature sensor.

6. The 3D printer system of claim 1, wherein the rack is coupled with the 3D motion system and moves along with at least one axis of the 3D printer system.

7. The 3D printer system of claim 1, wherein the one or more data processing apparatus are configured to execute the instructions to determine the second point by performing operations comprising repeatedly recalculating a heating equation using actively collected temperature measurements.

8. The 3D printer system of claim 1, wherein the cooling device is coupled with the rack.

9. The 3D printer system of claim 1, wherein the extrusion tool comprises a melt zone and a heat sink, the melt zone is upstream from an aperture of a nozzle of the extrusion tool, the heat sink is upstream from the melt zone, and the cooling device is configured to actively cool the heat sink, the nozzle, or both.

10. The 3D printer system of claim 9, wherein the cooling device comprises a fan.

11. The 3D printer system of claim 9, wherein the cooling device comprises a Peltier device positioned on the rack to make contact with the heat sink, the nozzle, or both, when the extrusion tool is relocated on the rack.

12. The 3D printer system of claim 1, wherein the extrusion tool comprises at least a hot end of a Fused Filament Fabrication (FFF) extruder assembly.

13. A method comprising:
   identifying a first point in a manufacturing process when an extrusion tool will be mounted on a carriage and in position to extrude material in a build space;
   determining a second point, which precedes the first point in the manufacturing process, when the extrusion tool will be located on a rack, wherein a time between the second point and the first point in the manufacturing process is determined in accordance with the material to be extruded by the extrusion tool; and
   triggering a heating device to begin pre-heating the extrusion tool at the second point before mounting of the extrusion tool to the carriage, such that the material in the extrusion tool is melted by the first point in the manufacturing process;
   triggering a cooling device to reduce a temperature of the extrusion tool when the extrusion tool is relocated on the rack after use of the extrusion tool in the manufacturing process;
   identifying a third point after the first point in the manufacturing process when use of the extrusion tool will end and the extrusion tool will be relocated on the rack;
   determining a fourth point, which succeeds the third point in the manufacturing process, when the extrusion tool will be relocated on the rack, wherein a time between the third point and the fourth point in the manufacturing process is determined in accordance with the material extruded by the extrusion tool and the temperature of the extrusion tool during the material extrusion; and
   operating the cooling device until the fourth point in the manufacturing process to reduce the temperature of the extrusion tool;
   wherein determining the fourth point comprises repeatedly recalculating a cooling equation using actively collected temperature measurements.

14. The method of claim 13, wherein the extrusion tool reaches a target temperature just before arriving in the position to extrude the material in the build space.

15. The method of claim 13, wherein determining the second point comprises repeatedly recalculating a heating equation using actively collected temperature measurements.

16. A non-transitory computer-readable medium encoding instructions that cause a data processing apparatus associated with a three dimensional (3D) printer system to perform operations comprising:
   identifying a first point in a manufacturing process when an extrusion tool will be mounted on a carriage and in position to extrude material in a build space;
   determining a second point, which precedes the first point in the manufacturing process, when the extrusion tool will be located on a rack, wherein a time between the second point and the first point in the manufacturing process is determined in accordance with the material to be extruded by the extrusion tool; and
   triggering a heating device to begin pre-heating the extrusion tool at the second point before mounting of the extrusion tool to the carriage, such that the material in the extrusion tool is melted by the first point in the manufacturing process;
   triggering a cooling device to reduce a temperature of the extrusion tool when the extrusion tool is relocated on the rack after use of the extrusion tool in the manufacturing process;
   identifying a third point after the first point in the manufacturing process when use of the extrusion tool will end and the extrusion tool will be relocated on the rack;
   determining a fourth point, which succeeds the third point in the manufacturing process, when the extrusion tool will be relocated on the rack, wherein a time between the third point and the fourth point in the manufacturing process is determined in accordance with the material extruded by the extrusion tool and the temperature of the extrusion tool during the material extrusion; and
   operating the cooling device until the fourth point in the manufacturing process to reduce the temperature of the extrusion tool;
   wherein determining the fourth point comprises repeatedly recalculating a cooling equation using actively collected temperature measurements.

* * * * *